UNITED STATES PATENT OFFICE.

WILLIAM H. BROWN, OF ALEXIS, ILLINOIS.

COMPOUND FOR FACILITATING CHURNING OF BUTTER.

SPECIFICATION forming part of Letters Patent No. 558,035, dated April 14, 1896.

Application filed November 30, 1894. Serial No. 530,439. (No specimens.)

*To all whom it may concern:*

Be it known that I, WILLIAM H. BROWN, a citizen of the United States, residing at Alexis, in the county of Warren and State of Illinois, have invented a new and useful Compound for Facilitating the Churning of Butter, of which the following is a specification.

The object of this invention is to facilitate the manufacture of butter and to render easier and more effective the operation of churning. In this operation it is necessary that the casein and albumen constituents of milk and cream be made to give out or expel the butter globules, and this is usually effected by mechanically agitating the milk. It is my purpose, however, to perform the greater portion of this separation by the use of chemicals which will act on the milk or cream so as to dissolve the casein and albumen, thereby setting free the butter globules and making it possible to form them into a compact mass by the aid of a slight agitation.

The principal object of the invention is, however, to make it possible to form pure butter from sweet milk and without having to mechanically agitate it for a period of more than from five to fifteen minutes. This is made possible by causing the dissolution of the casein and albumen and the immediate liberation of the butter without the necessity of "setting" the milk until a sufficient amount of cream has been obtained, this portion of the operation being often, if not invariably, productive of milk or cream more or less sour, and resulting in correspondingly sour and impure butter.

With these ends in view my invention consists in a definite composition of matter having such chemical properties as will enable it to bring about a dissolution of the casein and albumen, and in the formation thereof I first take alum of that class which has been derived from white clay and purify it by the process of recrystallization, after which it is placed in a porous earthenware vessel and subjected to the action of heat at about 300° Fahrenheit until the water has been resolved into its constituent gases. The product of this operation will be crystallized flakes of alum, which I subsequently reduce to a fine powder. To this salt I add bicarbonate of soda in the proportion of two hundred and twenty grains of bicarbonate of soda to nine hundred grains of alum. The next step in the formation of my compound is taking pure flake pepsin of that degree of strength of which fifteen grains will coagulate one pint of sweet milk in five minutes. To one part of such pepsin I add six parts of corn-starch which has been previously subjected to a heat of 400° Fahrenheit, thus forming a preparation of pepsin with dextrine, to prevent the pepsin from absorbing moisture.

The mixture, above described, of alum and bicarbonate of soda forms one ingredient of my compound, the prepared pepsin a second ingredient, and as a third ingredient I use pure white gum-arabic reduced to a fine white powder. Thus the formula will be: mixture of alum and bicarbonate of soda, eleven hundred and twenty grains, (such mixture being made up of nine hundred grains of alum and two hundred and twenty grains of bicarbonate of soda;) prepared pepsin, thirty grains, (consisting of pepsin and dextrine, formed by the combination of pepsin with previously-heated corn-starch;) pure white gum-arabic, one hundred and thirty grains. These ingredients should be mixed in a dry state and thoroughly mingled by agitation.

In the use of the compound thirty grains should be added to each gallon of sweet milk, or twenty-four grains for each gallon of sweet cream, should it be desired to churn cream instead of milk. The compound and milk or cream should be mixed together and churned in the usual way, and it will be necessary to prosecute the operation of churning only for a comparatively short time, which varies from five to fifteen minutes. The result will be pure sweet butter, free from all decayed animal matter, such as is necessarily present in butter derived from sour milk or cream. Owing to the absence in the butter of decomposed animal matter, it will keep longer than that made from sour milk or cream, and by means of my discovery butter may be made in one-fourth the time which it usually takes.

The compound is also adapted for use in the manufacture of cheese, and the product will be a high quality of well-flavored cheese, due to the absence of decomposed animal matter.

The chemical operation or effect of the compound upon the cream or milk may be described as the dissolution of the component elements or molecules of casein and albumen, which sets free the butter globules, allowing them to rise to the surface, where they will gather in a firm mass under the influence of the mechanical agitation produced by the churning operation. The butter will still retain the lactose and butyric acids which give it the peculiar flavor found only in butter made from fresh milk and sweet cream.

The advantages derived from the use of bicarbonate of soda are, first, that when combined with clay-alum in the proportions hereinbefore mentioned the proper amount of carbonic-acid gas is generated to insure the massing of the butter-fats on the surface of the milk; second, that bicarbonate of soda neutralizes the acids in the milk, keeps it sweet and fresh, while at the same time it assists the pepsin in decomposing or digesting the casein; third, that it prevents a rapid coagulation of the albumen and gives ample time to allow butter-fat to be gathered before the coagulation takes place, (usually from twenty to thirty minutes,) and, fourth, that it precipitates the decomposed albumen and casein and thus insures a complete separation of the butter-fat from the other parts of the milk, leaving the butter molecules unbroken and free from any decomposed albumen or casein.

Bicarbonate of soda is indispensable, so far as I am aware, in making a pure grade of butter, inasmuch as I am aware of no substitute therefor or any material which can be employed which will serve to eliminate albumen from the butter as finally separated from the milk.

Having described my invention, what I claim is—

A composition of matter for facilitating the churning operation, the same consisting of alum, bicarbonate of soda, prepared pepsin, (formed of a mixture of pepsin with corn-starch subjected to a high temperature) and gum-arabic, combined in substantially the proportions specified.

In testimony that I claim the foregoing as my own I have hereto affixed my signature in the presence of two witnesses.

WILLIAM H. BROWN.

Witnesses:
GEO. BROWN,
WILL. BROWN.